US009466265B2

(12) United States Patent
Cho et al.

(10) Patent No.: US 9,466,265 B2
(45) Date of Patent: Oct. 11, 2016

(54) DISPLAY DEVICE AND METHOD OF CONTROLLING THEREFOR

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 573 days.

(21) Appl. No.: 13/888,569

(22) Filed: May 7, 2013

(65) Prior Publication Data

US 2014/0300557 A1  Oct. 9, 2014

(30) Foreign Application Priority Data

Apr. 3, 2013 (KR) .......................... 10-2013-0036198

(51) Int. Cl.
*G09G 5/10* (2006.01)
*G09G 5/22* (2006.01)
*G06F 3/0488* (2013.01)
*G06F 1/16* (2006.01)

(52) U.S. Cl.
CPC ............... *G09G 5/22* (2013.01); *G06F 1/1637* (2013.01); *G06F 3/0488* (2013.01); *G06F 2200/1614* (2013.01); *G06F 2200/1637* (2013.01)

(58) Field of Classification Search
CPC ............... G06F 2200/1637; G06F 2200/1614; G06F 1/1637
USPC .......................................................... 345/649
See application file for complete search history.

(56) References Cited

U.S. PATENT DOCUMENTS

| | | | |
|---|---|---|---|
| 6,545,669 B1 * | 4/2003 | Kinawi et al. ................ | 345/173 |
| 8,803,908 B2 * | 8/2014 | Van Osten et al. ........... | 345/619 |
| 2009/0019401 A1 * | 1/2009 | Park et al. .................... | 715/841 |
| 2010/0117975 A1 * | 5/2010 | Cho .............................. | 345/173 |
| 2010/0120470 A1 * | 5/2010 | Kim et al. .................... | 455/566 |
| 2010/0295805 A1 * | 11/2010 | Shin et al. .................... | 345/173 |
| 2012/0154305 A1 | 6/2012 | Nunomaki | |
| 2012/0262462 A1 | 10/2012 | Montan et al. | |
| 2013/0002133 A1 | 1/2013 | Jin et al. | |
| 2014/0118271 A1 * | 5/2014 | Lee et al. ...................... | 345/173 |
| 2015/0153862 A1 * | 6/2015 | Nakamura et al. ........... | 345/173 |

FOREIGN PATENT DOCUMENTS

KR  10-2009-0106768 A  10/2009

* cited by examiner

*Primary Examiner* — Barry Drennan
*Assistant Examiner* — Robert Craddock
(74) *Attorney, Agent, or Firm* — Birch, Stewart, Kolasch & Birch, LLP

(57) ABSTRACT

The present specification relates to a display device and a method for controlling the same, and more particularly, if an area in which an image is displayed includes a curved area, to a display device rotating the image according to a touch input in the curved area and providing additional information on the image together with the image and a method for controlling the same.

18 Claims, 13 Drawing Sheets

FIG. 9
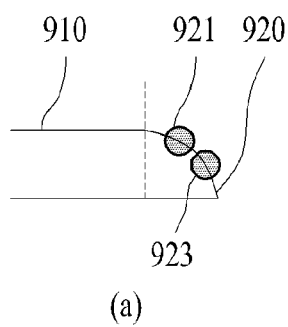
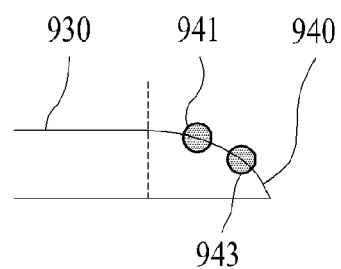

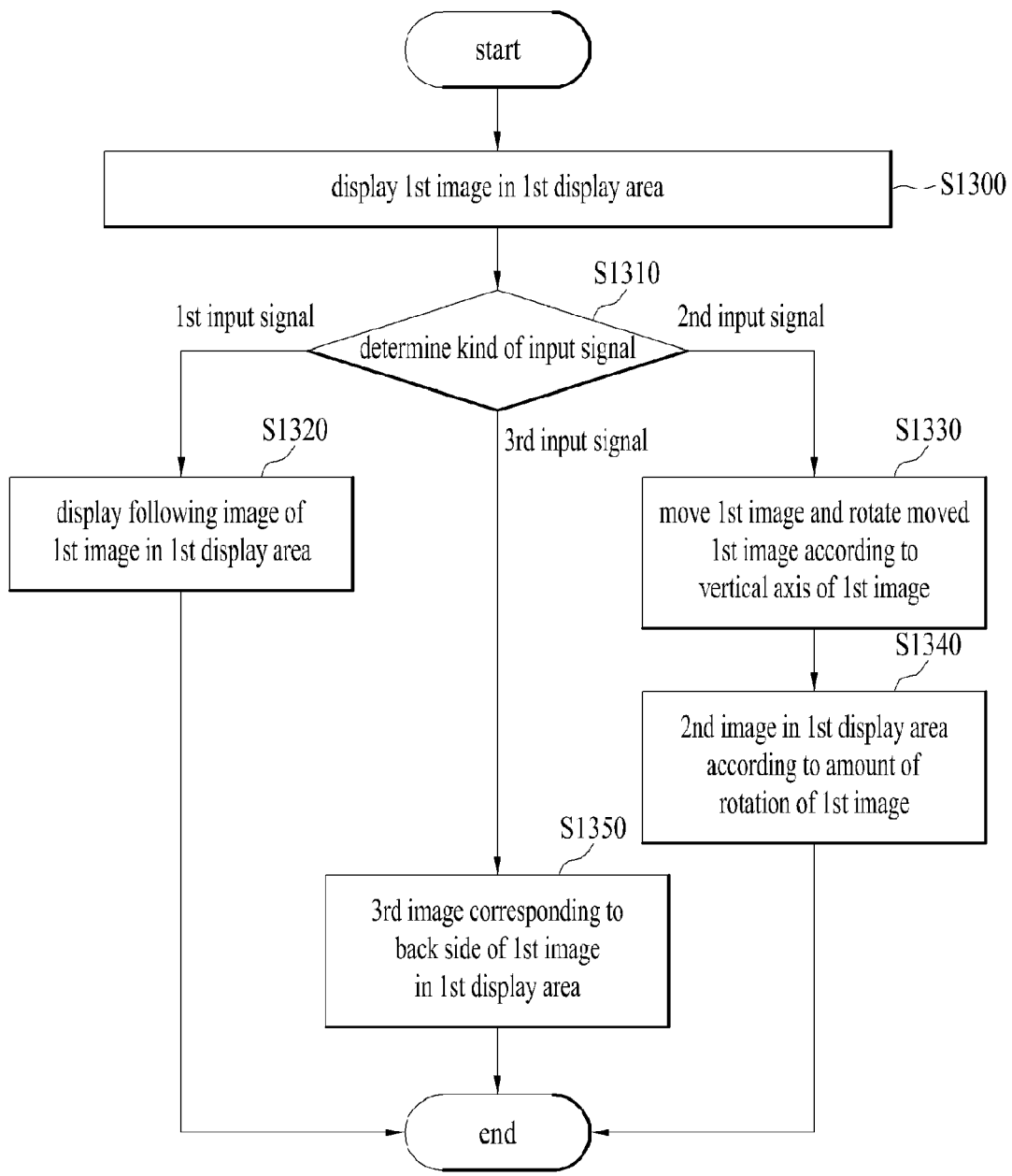

DISPLAY DEVICE AND METHOD OF CONTROLLING THEREFOR

Pursuant to 35 U.S.C. §119(a), this application claims the benefit of the Korean Patent Application No. 10-2013-0036198, filed on Apr. 3, 2013 which is hereby incorporated by reference as if fully set forth herein.

BACKGROUND OF THE INVENTION

1. Field of the Invention

The present specification relates to a display device and a method of controlling therefor, and more particularly, if an area in which an image is displayed includes a curved area, to a display device rotating the image according to a position of a touch input on the curved area and providing additional information on the image together with the image and a method of controlling therefor.

2. Discussion of the Related Art

As a display-related technology has been developed, various forms of a flexible display are under discussion. And, a commercialized flexible display is releasing.

Yet, since it is a transition period, a display device of which the flexible display is applied to a part of the display device is more released recently compared to the display device of which the flexible display is applied to the front of the display device. Thus, a display area of the display device may include a curved area as a part of the device. Yet, since an image of a 2D form is displayed, there exists a problem that a user is unable to realize the curved display area when the user touches the curved display area.

SUMMARY OF THE INVENTION

According to one embodiment, one object of the present specification intends to provide if a touch input is detected on a curved display area, a display device displaying an image by rotating the image according to a position of the touch input and a method of controlling therefor.

According to a different embodiment, another object of the present specification intends to provide a display device controlling an amount of rotation of an image according to a position of a touch input on a curved display area and a method of controlling therefor.

According to a different embodiment, another object of the present specification intends to provide a display device providing a graphic effect of an image capable of being bent according to a curved surface in a curved display area and a method of controlling therefor.

According to a different embodiment, another object of the present specification intends to provide a display device controlling an amount of additional information on an image and a method of controlling therefore.

To achieve these and other advantages and in accordance with the purpose of the present specification, as embodied and broadly described, according to one embodiment a display device includes a sensor unit configured to sense a user input and configured to deliver a signal according to a sensed result to a processor, a display unit configured to display an image, wherein the display unit includes a first display area which is plane and a second display area which is curved and concatenated with the first display area, and the processor configured to control the sensor unit and the display unit, wherein the processor further configured to display a first image in the first display area and display a control interface related to the first image in the second display area, display a following image of the first image in the first display area, if a first input signal is detected, move the first image and rotate the moved first image according to a vertical axis of the first image, if a second input signal is detected, and display a second image including an additional information related to the first image according to an amount of rotation of the first image.

To further achieve these and other advantages and in accordance with the purpose of the present specification, according to one embodiment a method of controlling a display device, which includes a display unit including a first display area which is plane and a second display area which is curved and concatenated with the first display area, includes the steps of displaying a first image in the first display area and a control interface related to the first image in the second display area, if a first input signal is detected, displaying a following image of the first image in the first display area, if a second input signal is detected, moving the first image and rotating the moved first image according to a vertical axis of the first image, and displaying a second image including an additional information related to the first image according to an amount of rotation of the first image.

Accordingly, the present specification provides the following effects and/or advantages.

According to one embodiment, having detected a touch input on a curved area, a display device may be able to display an image by rotating the image according to a position of the touch input. Hence, a user may be able to realize a touch of the curved display area.

And, according to a different embodiment, a display device may be able to control rotation information on an image according to a position of a touch input on a curved display area. Thus, a user may be able to feel that an extent of bending of the image changes according to the position of the touch input. In particular, the display device according to one embodiment may be able to enhance satisfaction for the senses of touch and sight of the user.

And, according to a different embodiment, a display device may be able to control an amount of additional information on an image according to a position of a touch input on a curved display area. Hence, a user may be able to control the amount of needed information by controlling the position of the touch input.

More specific effects of the invention shall be described in detail in the following description.

BRIEF DESCRIPTION OF THE DRAWINGS

FIG. 9 is a diagram of one embodiment of side views for display devices having a different gradient;

FIG. 13 is a flowchart for a method of controlling a display device according to one embodiment.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Figure 1:
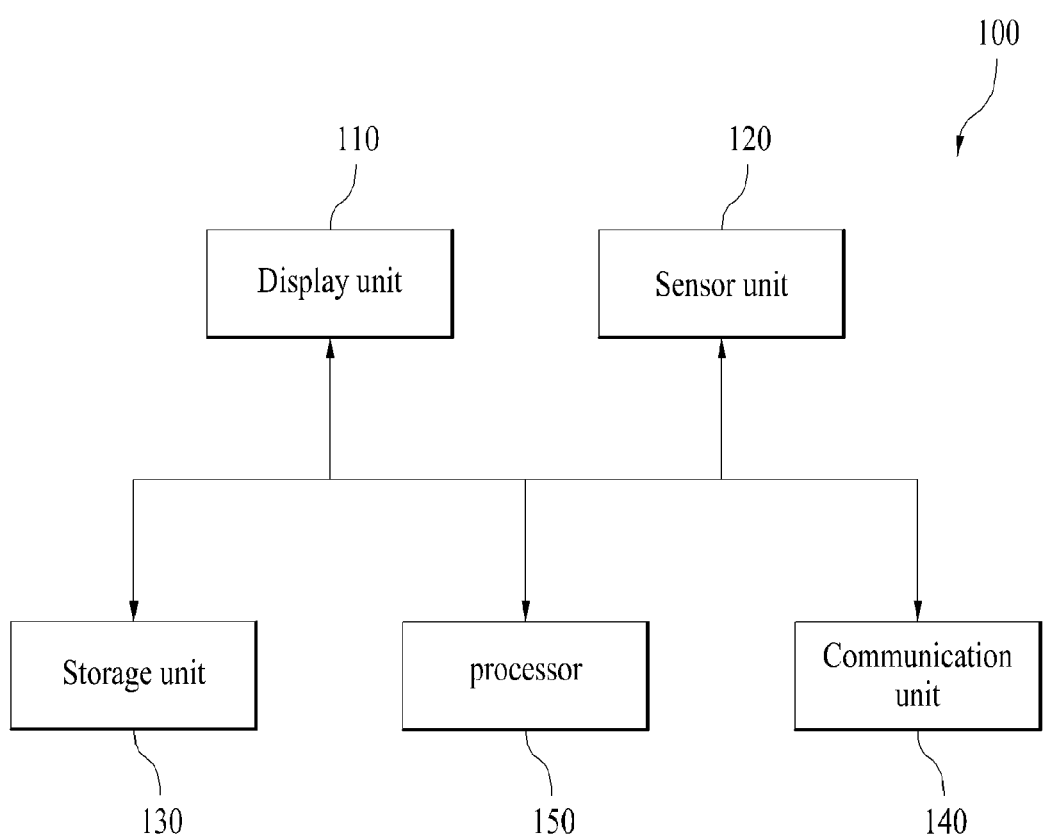
FIG. 1 is a block diagram of a display device according to one embodiment.

FIG. 1 is a block diagram of a display device according to one embodiment. Yet, FIG. 1 is just one embodiment. A configuration module can be deleted or new configuration module can be added according to a necessity of a person engaged in the corresponding field.

As shown in FIG. 1, a display device 100 according to one embodiment may include a display unit 110, a sensor unit 120, a storage unit 130, a communication unit 140, and a processor 150.

The display unit 110 may be able to display an image in a display screen. The display unit 110 may be able to output an image based on a content implemented by the processor 150, an application, or a control command of the processor 150.

The display unit 110 may include a flexible display. Thus, the display unit 110 may include a curved display area. This shall be described in detail with reference to FIG. 2 to FIG. 4.

The sensor unit 120 senses a surrounding environment of a display device 100 using at least one sensor installed in the display device 100 and may be then able to deliver a signal according to a sensed result to the processor 150. And, the sensor unit 120 senses a user input and may be then able to deliver a signal according to a sensed result to the processor 150.

Hence, the sensor unit 120 may be able to include at least one sensing means. As one embodiment, the at least one sensing means may include such a sensing means as a gravity sensor, a terrestrial magnetism sensor, a motion sensor, a gyro sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, and the like.

And, the sensor unit 120 is a common name for the various aforementioned sensing means. The sensor unit senses various inputs of a user and the environment of the display device 100 and may be then able to deliver the sensed result to the processor 150 in order for the processor to perform an operation according to the sensed result. The environment of the display device 100 may include location information of a user using the display device 100. In particular, the display device 100 may be able to sense a position of the user locating near the display device 100 via such a various sensors as a proximity sensor, an image sensor, and the like.

And, the aforementioned sensors may be included in the display device 100 as a separate element or may be included in the display device in a manner of being combined as at least one element.

Meanwhile, in case that the display unit 110 includes a touch sensitive display, the display unit 110 may be able to sense a user input such as a touch input.

Thus, the processor 150 may be able to deliver a signal according to a sensed result resulted from the sensor unit 120 or the display unit 110 to the processor 150. And, the processor 150 generates a control signal according to the received signal and may be then able to control a configuration unit included in the display device using the control signal.

In other word, the processor 150 receives a user input as an input signal via the sensor unit 120 or the display unit 110 and may be then able to generate a control signal using the input signal.

If each step or operation performed in a display device is started or progressed by a user input, assume that the process of generating an input signal and a control signal according to the user input is included in the aforementioned process although it is not duplicately explained in the following description.

And, it may be possible to represent that the processor is configured to control the configuration unit included in the display device or the display device according to the user input and it is also possible to explain the processor and the display device in a manner of equating.

The storage unit 130 may be able to store such a various digital data as an audio, a picture, an application, and the like. The storage unit 130 indicates such a various digital data storing space as a flash memory, a random access memory (RAM), a solid state drive (SSD), and the like. The storage unit 130 can be used for a buffering to output an image obtained via an image sensor of the sensor unit 120.

And, the storage unit 130 may be able to temporarily store a data received from an external device via the communication unit 140. In this case, the storage unit 130 can be used for a buffering to output a data received from the external device in the display device 100. In this case, the storage unit 130 can be selectively installed in the display device 100.

The communication unit 140 may be able to transceive data with an external device by performing a communication using various protocols. And, the communication unit 140 accesses an external network in wired or wireless and may be then able to transceive such a digital data as content, an application, and the like. In this case, the communication unit 140 can be selectively installed in the display device.

Besides, although it is not depicted in FIG. 1, the display device can be equipped with an audio input/output unit or a power unit.

The audio output unit (not depicted) includes such an audio output means as a speaker, earphones, and the like. And, the audio output unit may be able to output an audio based on the content implemented in the processor 150 or a control command of the processor 150. In this case, the audio output unit can be selectively installed in the display device 100.

The power unit (not depicted) is a power source connected to a battery inside of the display device 100 or an external power supply and may be able to supply power to the display device 100.

And, the display device 100 depicted in FIG. 1 is a block diagram according to one embodiment. Blocks represented in a manner of being separated indicate the logically distinguished elements of the display device. Hence, the elements of the aforementioned display device may be equipped with a single chip or a plurality of chips according to the design of the display device.

Figure 2:
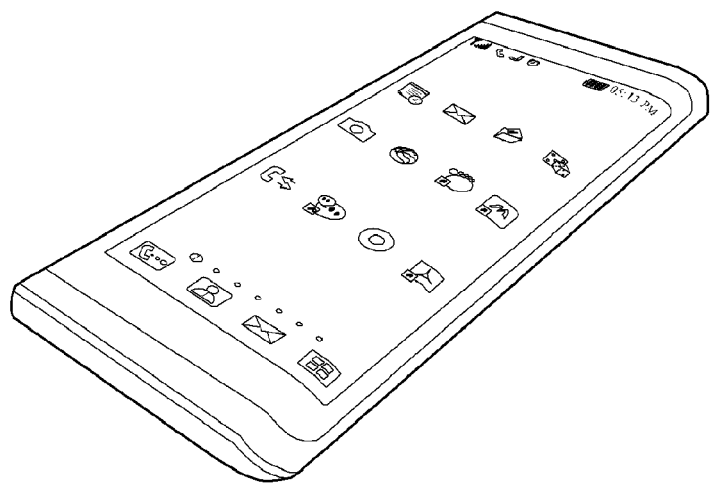
FIG. 2 is a perspective view of a display device according to one embodiment.

FIG. 2 is a perspective view of a display device according to one embodiment.

The display unit of the display device according to one embodiment may include a curved area. FIG. 2 depicts one embodiment including a curved area situated only at one side of a display area. Yet, unlike FIG. 2, the display unit of the display device may be able to include the curved area at one side and another side of the display area. And, the curved area may be non-limited to a specific form. Yet, for clarity of description, the display device including only the curved area situating at one side of the display area is explained as a representative embodiment.

Figure 3:
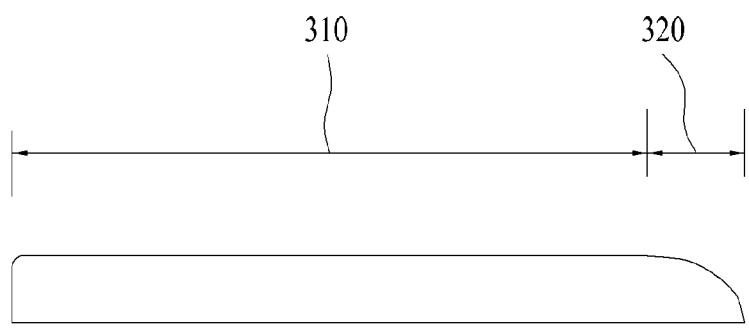
FIG. 3 is a side view of a display device according to one embodiment.

FIG. 3 is a side view of a display device according to one embodiment. FIG. 3 is the side view for the bottom direction of the display device.

As shown in FIG. 3, the display device may include a plane display area 310 and a curved display area 320. The plane display area 310 can be situated at the front of the display device. And, the curved display area 320 is adjacent to the plane display area 310 and may be situated at a side of the display device.

And, the curved display area 320 can be equipped with in a form of a plane. If the curved display area 320 corresponds to the plane, the curved display area is not situated at on the same flat with the plane display area 310 and can be installed in a manner of forming a prescribed angle. Hence, the curved display area of the present specification indicates either a display area practically forming a curved surface or the display area adjacent to a main display area and not situating at a same flat with the main display area.

Figure 4:
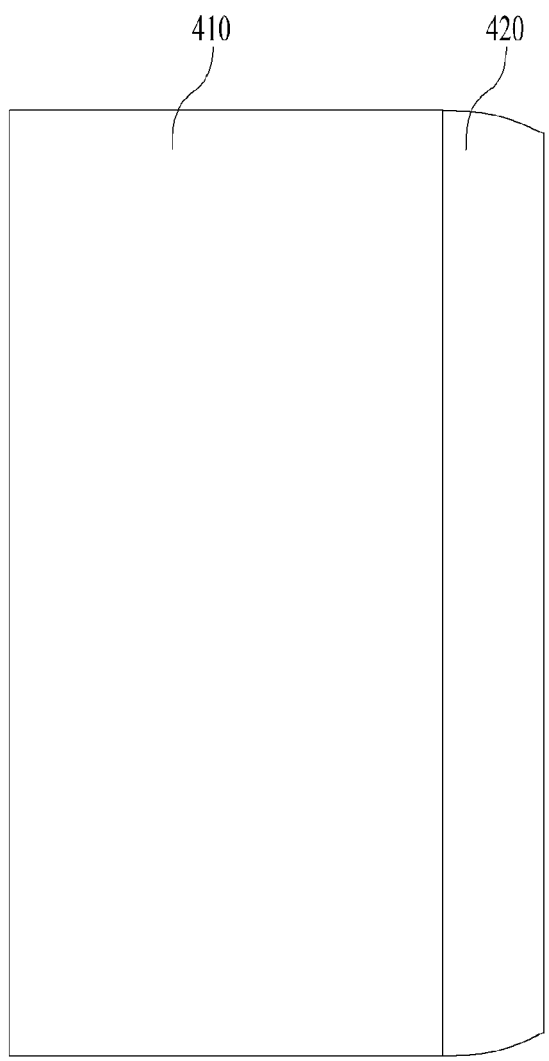
FIG. 4 is a front view of a display device according to one embodiment.

FIG. 4 is a front view of a display device according to one embodiment.

As mentioned in the foregoing description, the display device may include a first display area 410, which is a plane, and a second display area 420 adjacent to the first display area 410 including a curved area.

In this case, if a user is positioned at the front of the display device, the user is able to see the plane display area 410 and a part of the curved display area 420. Hence, if a touch input of the user is moving from the first display area to the second display area, the display device may be able to provide a curved sense of the second display area 420 felt by a touching hand of the user together with a visual effect according to the curved sense. This shall be described in detail with reference to FIG. 6 to FIG. 8.

Prior to that, one embodiment for a case that the touch input of the user is completed within the first display area is explained with reference to FIG. 5.

Figure 5:
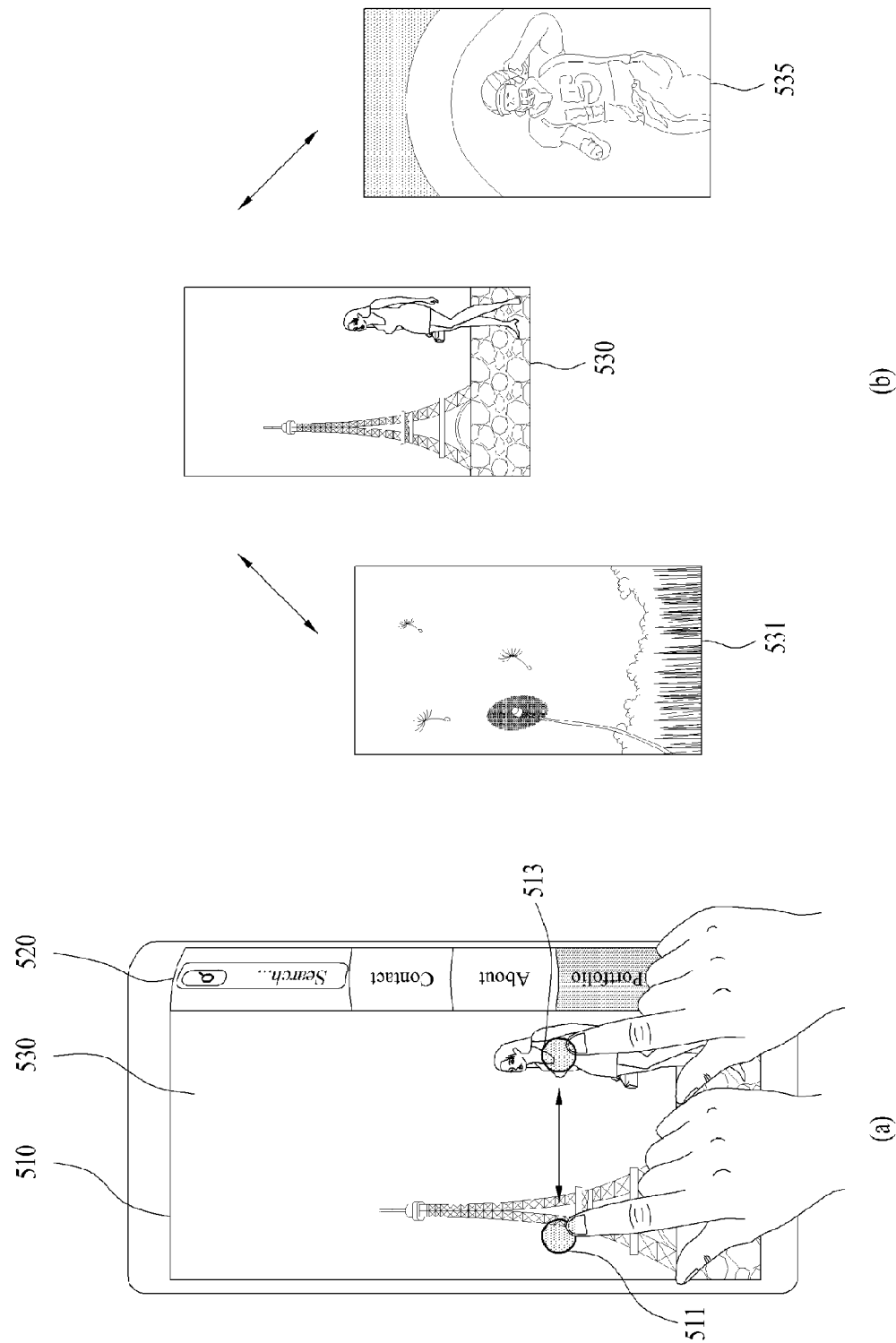
FIG. 5 is a diagram of one embodiment for an operation of a display device according to a first input signal.

FIG. 5 is a diagram of one embodiment for an operation of a display device according to a first input signal.

FIG. 5 (*a*) is a diagram of one embodiment of a display device displaying a first image 530 in a first display area 530 and a control interface related to the first image 530 in a second display area 520.

Having detected the first input signal, the display device may be able to display a following image of the first image in the first display area 510.

The first input signal may include a signal generated by a continuous touch input starting from the first display area 510 and ending in the first display area 510. For instance, the first input signal may be generated by a flip operation of a user for the first display area 510.

In this case, the display device may be able to determine a following image of the first image 530 according to a direction from a start point to an end point of a touch input corresponding to the first input signal.

Specifically, at least one image to be displayed in the display device can be stored according to a sequential order based on a saved or generated date, time, or the like. Hence, as shown in FIG. 5 (*b*), there may exist a previous image 531 of the first image 530 and a following image 535 of the first image 530 according to the sequential order. In this case, the sequential order may vary according to a reference direction.

For instance, if a touch input of a user corresponding to the first input signal starts on a first point 511 and ends on a second point 513 as shown in FIG. 5 (*a*), the reference direction corresponds to a right-hand side. Thus, the display device may be able to display the following image 535 of the first image 530. On the contrary, if the touch input of the user corresponding to the first input signal starts on the second point 513 and ends on the first point 511, the reference direction corresponds to a left-hand side. Thus, the display device may be able to display the previous image 531 of the first image 530 as a following image.

In particular, the display device may be able to determine the following image of the first image according to the direction of the touch input corresponding to the first input signal. According to the direction of the touch input, the previous image may become the following image and the following image may become the previous image.

Meanwhile, the touch input includes the input resulted from being physically contacted by such a touching means as a hand of the user, a pen, and the like. Although there is no physical contact by the touching means, the touch input may include an input resulted from hovering of the touching means.

Figure 6:
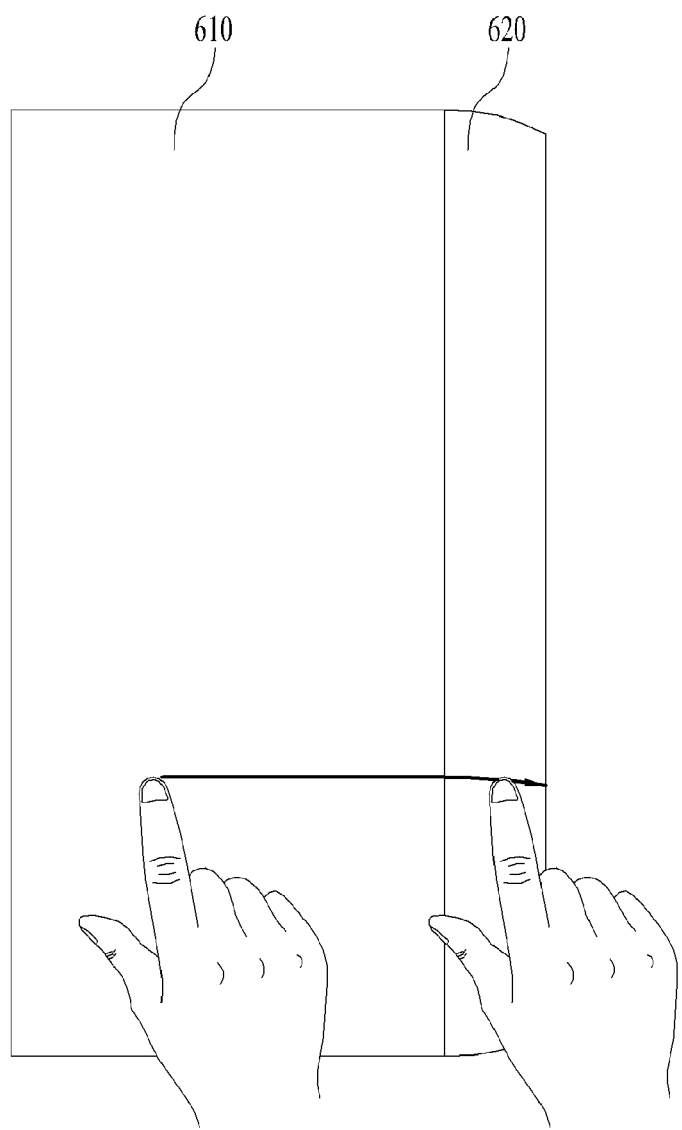
FIG. 6 is a diagram of one embodiment of a second and third input signal for a display device.

FIG. 6 is a diagram of one embodiment of a second and third input signal for a display device.

As shown in FIG. 6, the second and third input signal are signals generated by a continuous touch input starting on the first display area 610 and ending on the second display area 620. Yet, the second input signal and the third input signal are different from each other in that the second input signal maintains a state of touching for a preset time on the point where the touch input ends.

In particular, the second input signal may be able to include a signal generated by the first touch input moving from the first display area 610 to the second display area 620 and the signal generated by the second touch input, which is concatenated with the first touch input and continuously touches on the second display area 620 for a preset time. For instance, the second input signal can be generated by both a drag operation dragging the first touch input of a user from the first display area 610 to the second display area 620 and a touch maintaining operation on the second display area 620. This shall be described in detail later with reference to FIG. 8.

The third input signal may be able to include a signal generated by a continuous touch input starting on the first display area 610 and ending on the second display area 620. For instance, the third input signal may include a signal generated by a drag operation dragging the touch input from the first display area 610 to the second display area 620. This shall be described in detail with reference to FIG. 7.

Figure 7:
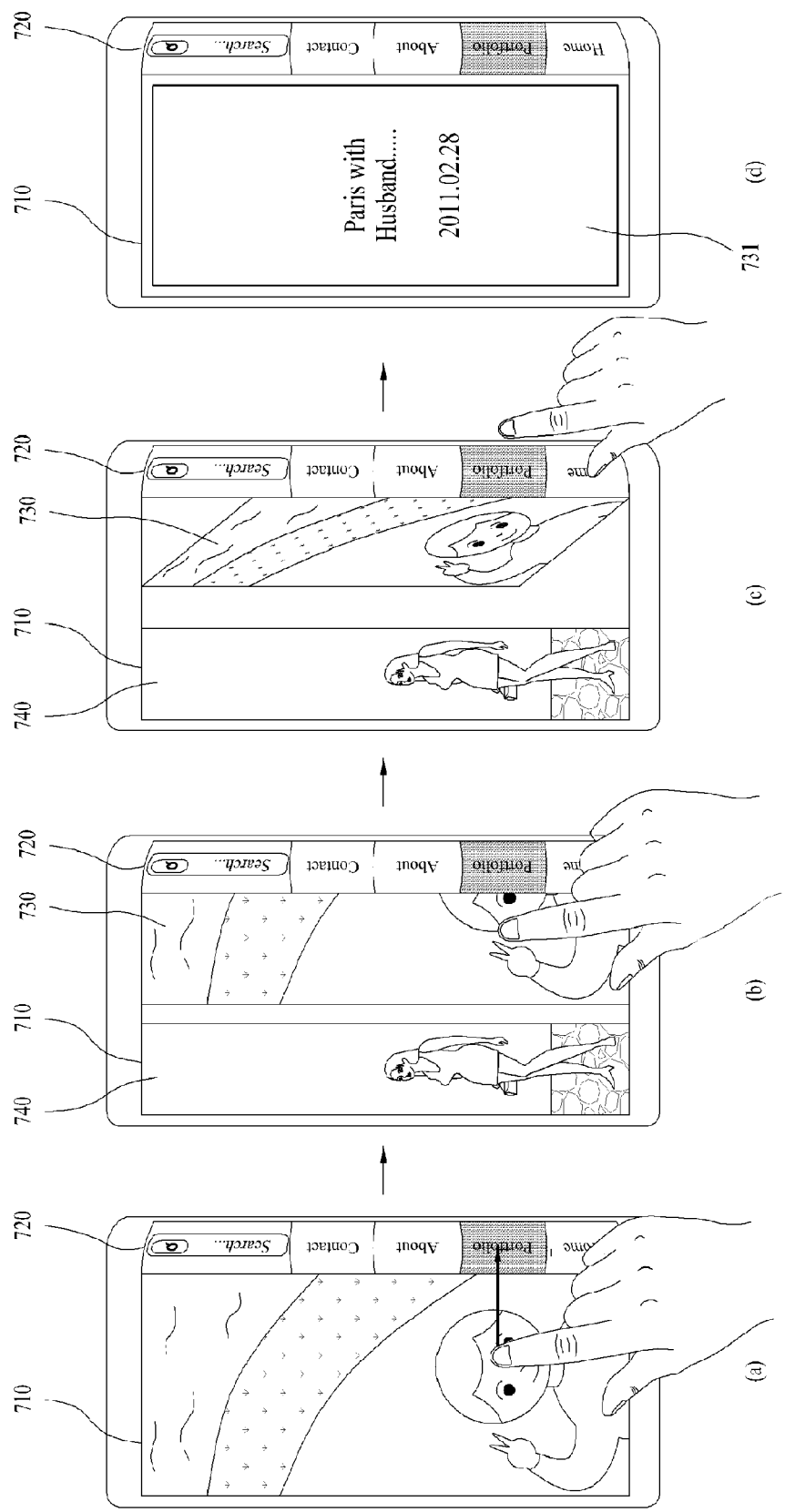
FIG. 7 is a diagram of one embodiment for an operation of a display device according to a third input signal.

FIG. 7 is a diagram of one embodiment for an operation of a display device according to a third input signal.

Having detected a third input signal, the display device may be able to display a third image, which is a backside of the first image, in the first display area. The third image, which is the backside of the first image, may be able to include additional information related to the first image. As mentioned in the foregoing description, the third input signal may include a signal generated by the continuous touch input starting on the first display area 710 and ending on the second display area 720.

And, the additional information may be able to include at least one selected from the group consisting of file information on the first image, application information implementing the first image, memo information on the first image, and generation information of the first image.

As shown in FIG. 7 (a), the display device displays the first image in the first display area 710 and may be able to display a control interface related to the first image in the second display area 720. The control interface may be able to include at least one selected from the group consisting of an interface editing the first image, the interface configuring a path to store the first image, and the interface controlling a magnification of the first image.

As shown in FIG. 7 (b), having detected a touch input on the first image displayed in the first display area 710, the display device may be able to move the first image 730 according to a direction of the touch input. And, the display device may be able to display a following image 740 of the first image 730 in an empty area generated by the movement of the first image 730.

As shown in FIG. 7 (c), having detected the touch input starting on the first display area 710 and ending on the second display area 720, the display device may be able to rotate the first image 730 to display the third image 731, which is the backside of the first image 730.

As shown in FIG. 7 (d), the display device may be able to display the third image 731, which is the backside of the first image 730, in the first display area 710. The third image 731 may include a memo information of a user on the first image as an additional information on the first image.

And, in case that the third image 731 is displayed in the first display area 710, the following image 740 of the first image can be overlaid with the third image by the display device. Hence, a user may be able to see the third image 731 only in the first display area 710.

Yet, having detected a 4$^{th}$ input signal, the display device displays the first image 730, which is the backside of the third image 731, again, and may be able to display the state of before the first image is rotated. Hence, the display device detected the 4$^{th}$ input signal may be able to display an image corresponding to FIG. 7 (a) or the image corresponding to FIG. 7 (b). In this case, the 4$^{th}$ input signal can be generated by a touch input moving in the opposite direction of the touch input corresponding to the first input signal.

As mentioned in the above, having detected the touch input moving from the first display area 710 to the second display area 720, the display device may be able to display the third image including the additional information on the first image.

Hence, as mentioned in FIG. 5, if a user wants to see the following image of the first image, the user starts a touch input on the first display area and ends the touch input on the first display area. And, as mentioned in FIG. 7, if the user wants to see additional information on the first image, the user starts the touch input on the first display area and ends the touch input on the second display area.

And, in case of displaying a third image according to a third input signal, the display device may be able to provide a user interface to the first display area 710 to generate additional information related to the first image. This shall be described later with reference to FIG. 12.

And, in case that a control interface of the second display area 720 includes an interface configuring a path to store the first image, the path for storing can be configured according to a position of the point on which the touch input is completed. For instance, in case that the control interface provides a folder icon indicating a position capable of storing the first image per area, the display device may be able to store the first image in the folder icon corresponding to the point on which the touch input is completed.

Meanwhile, if a touch input ends after maintaining the touch for a preset time, the display device according to one embodiment can operate differently although the touch input starts on the first display area and ends in the second display area.

Figure 8:
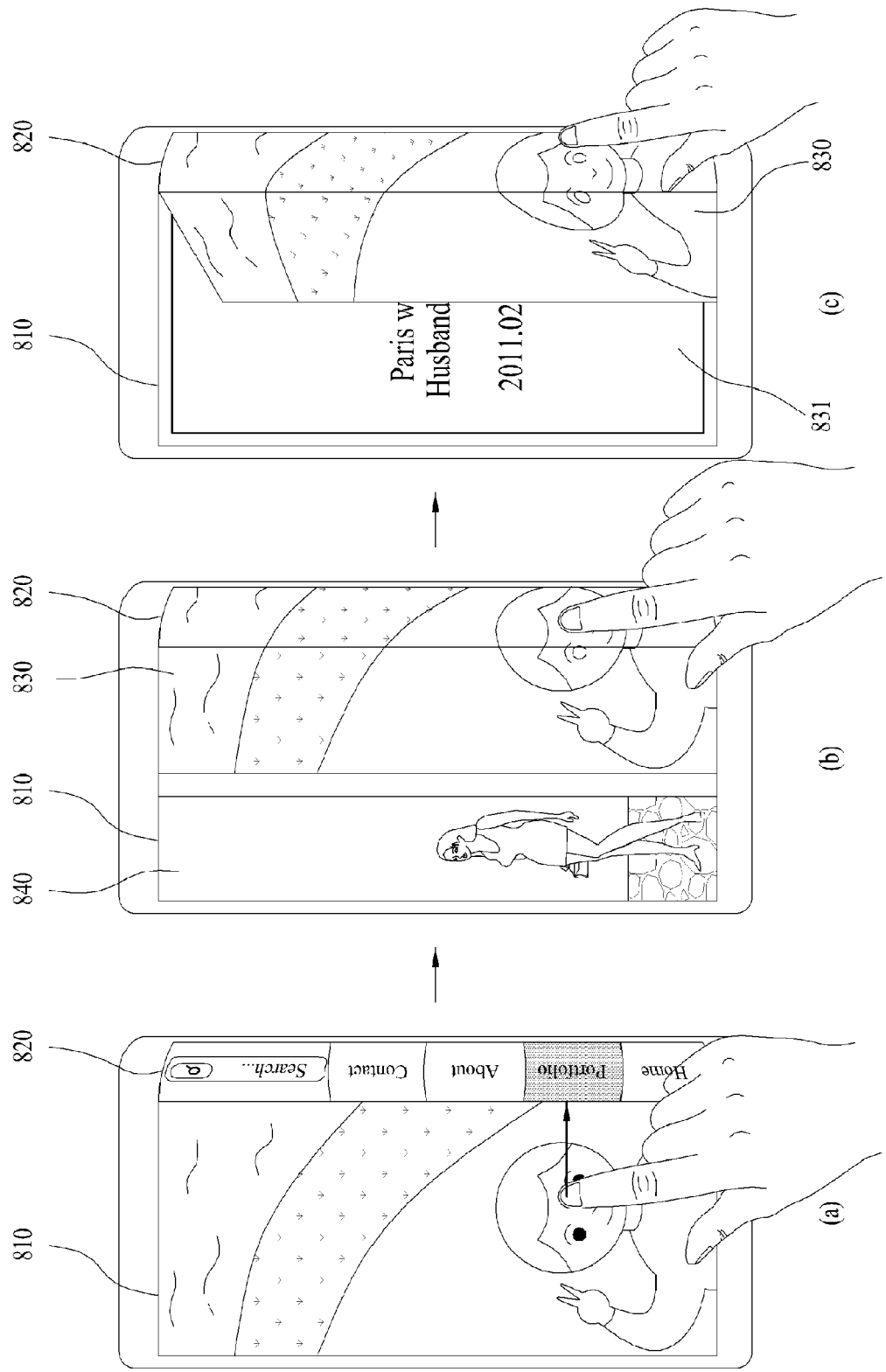
FIG. 8 is a diagram of one embodiment for an operation of a display device according to a second input signal.

FIG. 8 is a diagram of one embodiment for an operation of a display device according to a second input signal.

Having detected a second input signal, the display device moves the first image and may be able to move the first image according to a vertical axis of the first image. In this case, the display device may be able to display a second image including additional information related to the first image according to an amount of rotation of the first image.

The second input signal may be able to include a signal generated by a first touch input moving from the first display area 810 to the second display area 820 and the signal generated by a second touch input, which is concatenated with the first touch input and continuously touches on the second display area 820 for a preset time.

As shown in FIG. 8 (a), the display device displays the first image in the first display area 810 and may be able to display a control interface related to the first image in the second display area 820. The control interface may be able to include at least one selected from the group consisting of an interface editing the first image, the interface configuring a path to store the first image, and the interface controlling a magnification of the first image.

As shown in FIG. 8 (b), having detected the first touch input moving from the first display area 810 to the second display area 820, the display device may be able to move the first image 830 according to a direction of the first touch input. And, the display device may be able to display a following image 840 of the first image 830 in the first display area 810 in response to the first touch input. A user may feel as if the first image is moving according to the touch input.

And, in case of moving the first image 830 according to the first touch input of a second input signal, the display device may be able to use the second display area 820 as an additional display area of the first display area 810. Hence, the display device may be able to display the first image 830 in the second display area 820, which was used to display the control interface.

Yet, a size of the first image 830 is larger than the size of the second display area 820. Hence, the display device may be able to display not a whole of the first image 830 but a part of the image in the second display area 820 although the first image 830 is moved to the second display area. In particular, in case of moving the first image 830 according to the second input signal, the display device may be able to display the first image 830 in the first display area 810 and the second display area 820.

As shown in FIG. 8 (c), having detected a second touch input, which is concatenated with the first touch input and continuously touching on the second display area 820 for a preset time, the display device may be able to rotate the first image 830 according to a vertical axis of right-hand side of the first image 830. In this case, the display device may be able to adjust an amount of rotation of the first image 830 according to a position of the second touch input. For instance, the display device may be able to adjust the amount of rotation of the first image according to a display curvature corresponding to the position of the second touch input. This shall be described in detail with reference to FIG. 9.

And, the display device may be able to display a second image 831 including an additional information related to the first image in an area where a following image 840 of the first image 830 is displayed in the first display area 810. In particular, the following image 840 of the first image 830 can be overlaid with the second image 831 by the display device.

In this case, the display device may be able to adjust an amount of additional information included in the second image 831 according to the amount of rotation of the first image 830. For instance, if the amount of rotation of the first image 830 is small, the display device may be able to display only such additional information as a file name, a generation date, and the like via the second image 831. If the amount of rotation of the first image 830 is big, the display device may be able to display such additional information as a file name, a generation date, memo content, a size, a location in which the first image is stored, and the like via the second image 831. This shall be described in detail with reference to FIG. 10 to FIG. 11.

As mentioned earlier, the display device may be able to move the first image 830 to a direction of the second display area 820 in response to a touch input of a user. And, the display device may be able to provide a graphic effect as if the first image is floating in air in a manner of slightly floating the left part of the first image 830 instead of touching the ground using a curved feature of the second display area 820. Hence, in case of performing a touch input for a curved area, a user may feel as if a paper is erected due to the curved area. Hence, the display device may be able to differently adjust an extent of bending of the first image according to the extent of being curved of the second display area for the first display area.

FIG. 9 is a diagram of one embodiment of side views for display devices having a different gradient. FIG. 9 (a) corresponds to one embodiment of a display device having a second display area 920 with a steep gradient. FIG. 9 (b) corresponds to one embodiment of a display device having a second display area 940 with a gentle gradient.

As shown in FIG. 9 (a), the display device may include a plane first display area 910 and a curved second display area 920. In this case, according to whether an ending point of a second touch input of a user corresponding to a second input signal is a first point 921 or a second point 923, the display device may be able to vary the amount of rotation of the first image.

In case that the ending point of the second touch input corresponds to the first point 921, if assumed that the first image, which is made of paper, moves to the first point 921 of the second display area 920, the left-hand side of the first image will float in air from the first display area 910 in some degree. Hence, the display device may be able to provide a graphic effect as if the left part of the first image is floating in air by rotating the first image according to a vertical axis of a right-hand side in order for a user to get a feeling as if the user actually moves the first image, which is made of paper, to the second display area 920.

Hence, in case that the ending point of the second touch input corresponds to the second point 923, the display device may be able to provide a graphic effect as if the left part of the first image is floating more by rotating the first image more according to the vertical axis. In particular, the display device enables the first image to be rotated more on the second point 923 compared to the first point 921.

As shown in FIG. 9 (b), the display device may include a plane first display area 930 and a curved second display area 940. In this case, according to whether an ending point of a second touch input of a user corresponding to a second input signal is a first point 941 or a second point 943, the display device may be able to vary rotation information of the first image.

In particular, in case that the ending point of the second touch input corresponds to the second point 943, the display device may be able to further provide a graphic effect as if a left part of the first image is floating in air by rotating the first image more according to a vertical axis of a right-hand side of the first image. Yet, since a gradient of the second display area 940 according to FIG. 9 (b) is gentler than the gradient of the second display area 940 according to FIG. 9 (a), the amount of rotation of the first image may be less.

In FIG. 9, although a case that the second display area corresponds to a curved one is explained as one embodiment, an identical effect can be provided in case that the second display area corresponds to a plane as well. In this case, assume that the second display area does not exist in a same flat with the first display area. Hence, if an angle formed by the second display area with the first display area is larger, the display device may be able to make the amount of rotation of the first image bigger.

Figure 10:
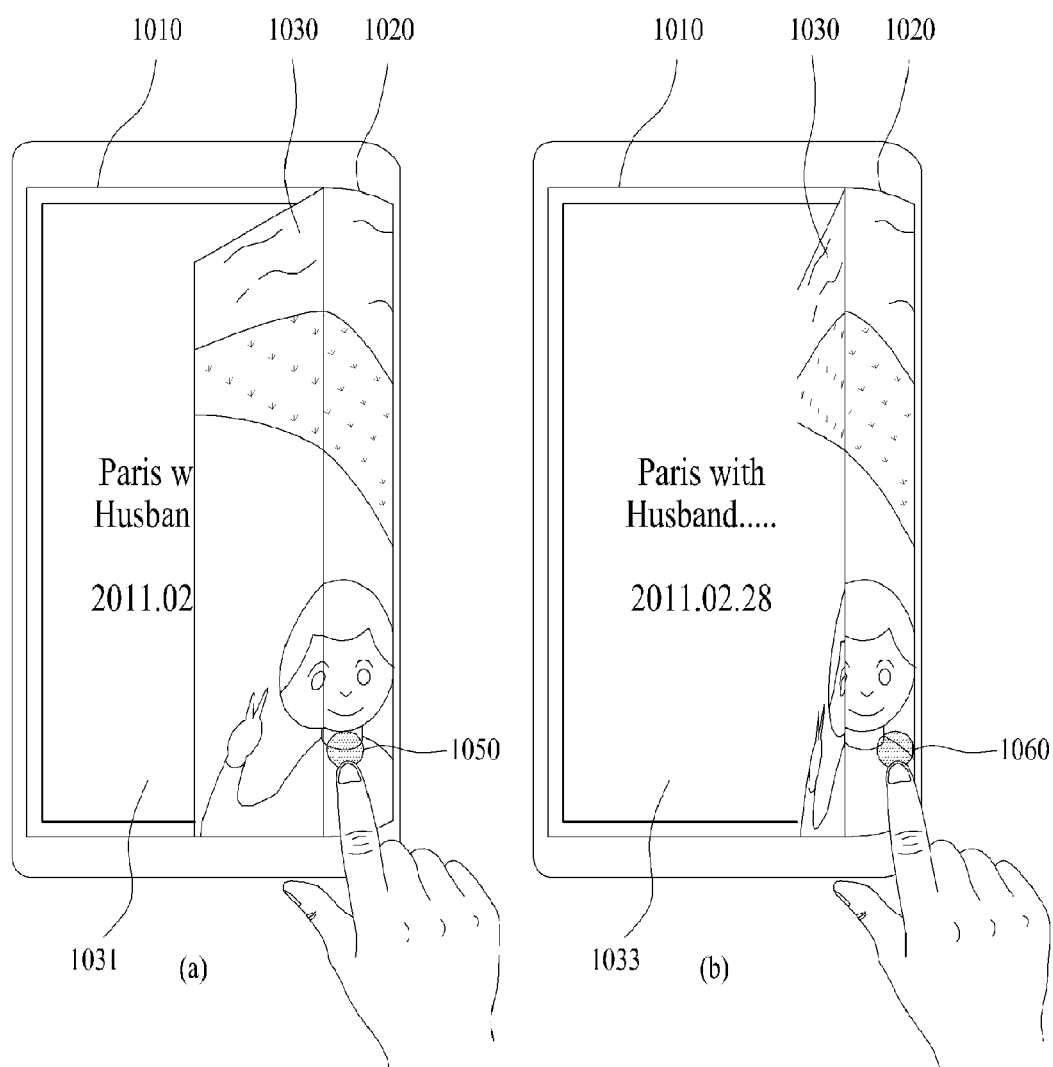
FIG. 10 is a diagram of one embodiment showing that an extent of bending of an image varies according to a position of a touch input.

FIG. 10 is a diagram of one embodiment showing that an extent of bending of an image varies according to a position of a touch input. FIG. 10 is one embodiment for a case that a first image 1030 is rotating according to a vertical axis of a right-hand side according to a second touch input corresponding to a second input signal.

FIG. 10 (a) is a case that an ending point of the second touch input corresponds to a first point 1050 as mentioned in FIG. 9. This case is a case that the rotation of the first image 1030 is performed a little. And, FIG. 10 (b) is a case that the ending point of the second touch input corresponds to a second point 1060 as mentioned in FIG. 9. This case is a case that the rotation of the first image 1030 is performed a lot more.

The display device displays a second image including additional information on the first image in the first display area. The display device may be able to adjust an amount of the additional information included in the second image according to the amount of rotation of the first image.

In this case, while identically configuring the amount of additional information included in the second image, the display device may be able to vary the amount of additional information to be seen to a user according to the amount of rotation of the first image.

Hence, since the amount of rotation of the first image 1030 is small, the display device according to FIG. 10 (*a*) may be able to make the additional information seen by a user to be small in a manner of blocking a part of the second image 1031 with the first image 1030. On the contrary, since the amount of rotation of the first image 1030 is large, the display device according to FIG. 10 (*b*) may be able to make the additional information seen by a user to be large in a manner of blocking the second image 1033 with the first image 1030 less than FIG. 10 (*a*).

Figure 11:
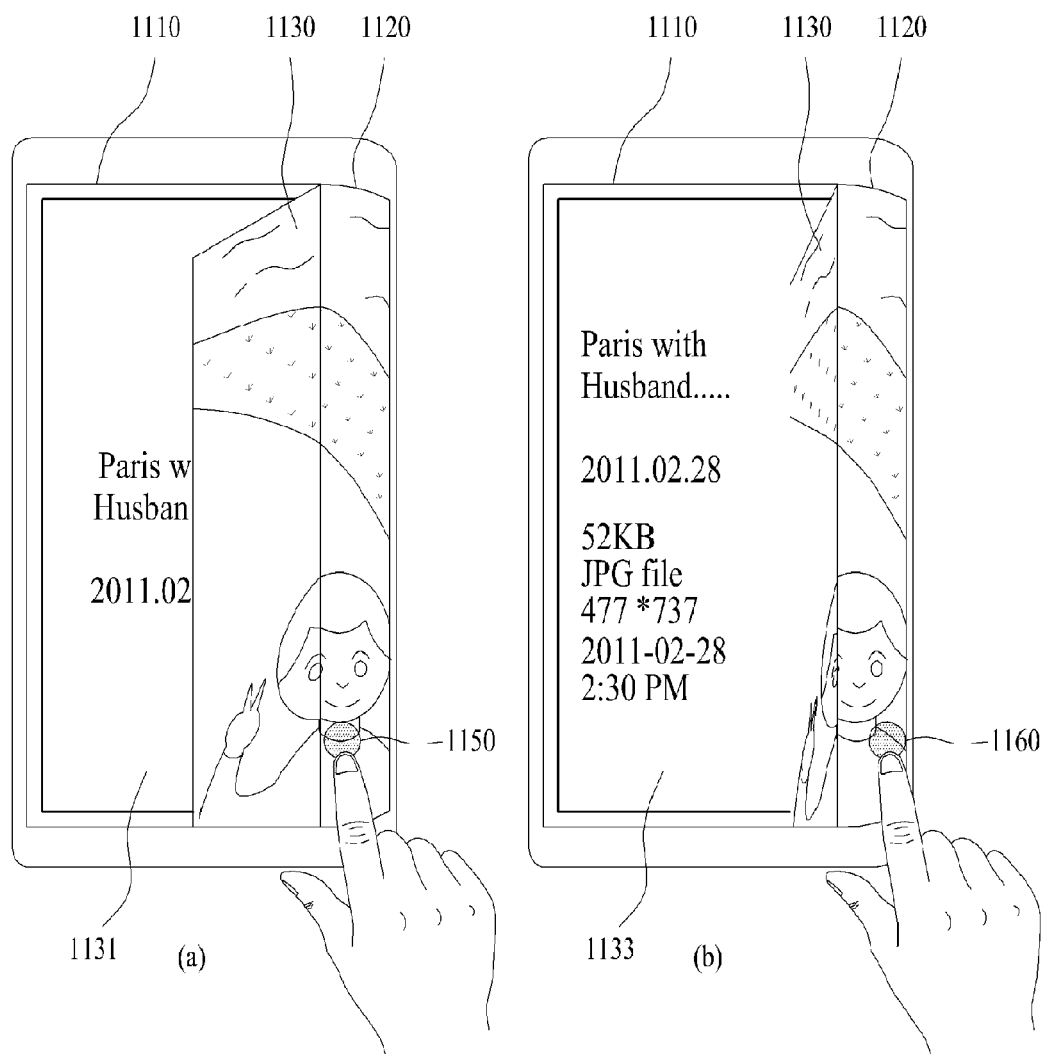
FIG. 11 is a diagram of one embodiment showing that an extent of bending of an image and an amount of additional information vary according to a position of a touch input.

FIG. 11 is a diagram of one embodiment showing that an extent of bending of an image and an amount of additional information vary according to a position of a touch input. FIG. 11 is one embodiment for a case that a first image 1130 is rotating according to a vertical axis of a right-hand side according to a second touch input corresponding to a second input signal.

FIG. 11 (*a*) is a case that an ending point of the second touch input corresponds to a first point 1150 as mentioned in FIG. 9. This case is a case that the rotation of the first image 1130 is performed a little. And, FIG. 11 (*b*) is a case that the ending point of the second touch input corresponds to a second point 1160 as mentioned in FIG. 9. This case is a case that the rotation of the first image 1130 is performed a lot more.

The display device displays a second image including additional information on the first image in the first display area. The display device may be able to adjust an amount of the additional information included in the second image according to the amount of rotation of the first image.

Hence, as shown in FIG. 11 (*a*), the second image 1131 may be able to include memo information on the first image 1130 only as additional information. And, as shown in FIG. 11 (*b*), the second image 1133 may be able to include such additional information as the memo information on the first image 1130, a generation date, image capacity, a kind of an image file, a size of the image, and a generation data of the image.

Hence, the display device may be able to adjust the additional information to be displayed according to a point 1150/1160 on which a touch input is maintained in the second display area 1120. Thus, if a user has many questions about the first image, the user may be able to check the additional information more by moving the point on which the touch input is maintained to an edge of the second display area.

As mentioned in the foregoing description, in case that a user maintains a touch input on the curved display area for a preset time, the display device according to one embodiment may be able to provide an effect making the touch on the curved area of the user more realistic by rotating the first image in response to the touch input and providing additional information according to the amount of rotation. In particular, the user curious about the additional information can be provided with the additional information more in a manner of adjusting the position of the touch input, which is maintained.

Meanwhile, in case that a second input signal is detected, the display device may be able to bookmark the first image. It is because maintaining a touch input by a user can be understood as an intention of the user interested in the first image.

And, in case that a second input signal is detected, the display device may be able to provide a user interface to generate additional information related to the first image. It is because maintaining a touch input by a user can be understood as an intention for the user to see the additional information on the first image or the intention to generate additional information.

Figure 12:
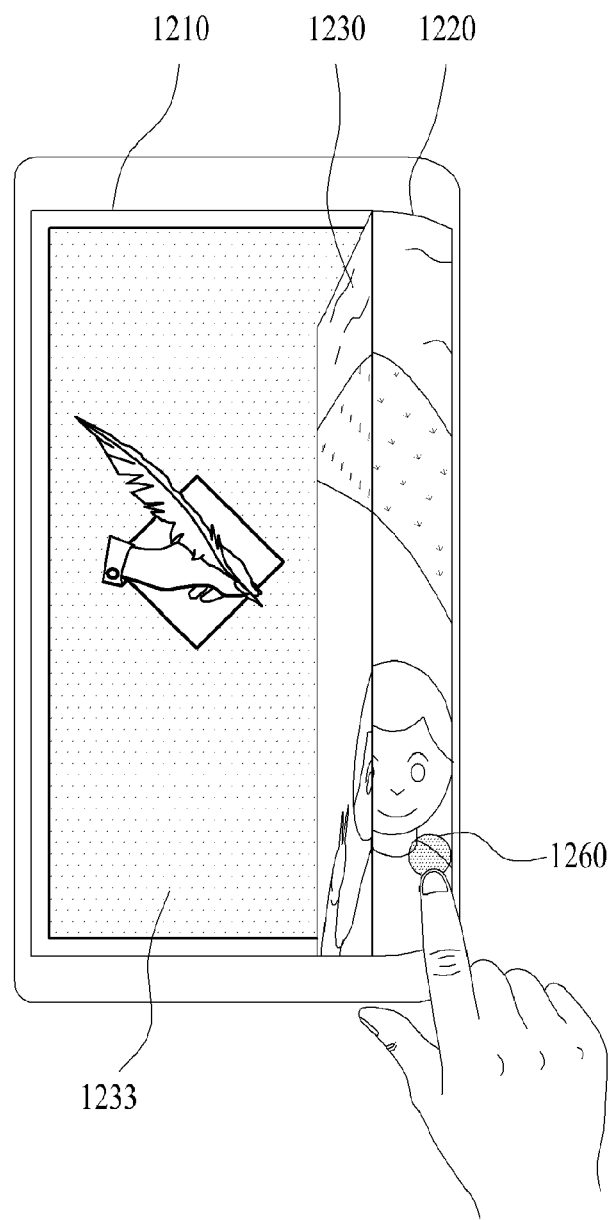
FIG. 12 is a diagram of one embodiment of a user interface provided by a display device to generate additional information.

FIG. 12 is a diagram of one embodiment of a user interface provided by a display device to generate additional information.

The display device shown in FIG. 12 moves a first image 1230 according to a touch input of a user and may be then able to display the first image 1230 in the first display area 1210 and the second display area 1220. In this case, if the user maintains the touch input on a specific point 1260 in the second display area 1220 for a preset time, the display device may be able to provide a user interface 1233 to generate additional information on the first image 1230. If there exists pre-stored additional information on the first image, the display device may be able to provide the additional information together with the user interface 1233.

FIG. 13 is a flowchart for a method of controlling a display device according to one embodiment. The display device according to one embodiment may be able to include a plane first display area and a second display area, which is not situated at a same flat with the first display area. The second display area may correspond to a curved area.

First of all, as described in FIG. 5, the display device displays the first image in the first display area [S1300] and may be able to display a control interface related to the first image in the second display area.

As described in FIG. 5 to FIG. 6, the display device may be able to judge a kind of an input signal generated by a touch input of a user [S1310]. The input signal may include a first, a second, and a third input signal.

The first input signal may include a signal generated by a continuous touch input starting on the first display area and ending on the second display area. For instance, the first input signal can be generated by a flip operation of a user for the first display area.

The second input signal may include a signal generated by a first touch input moving from the first display area to the second display area and the signal generated by a second touch input, which is concatenated with the first touch input and continuously touching on the second display area for a preset time. For instance, the second input signal can be generated by a drag operation of a user dragging from the first display area to the second display area and a touch input maintaining the touch input on the second display area for a preset time.

The third input signal may be able to include a signal generated by a continuous touch input starting on the first display area and ending on the second display area. For instance, the third input signal can be generated by a drag operation dragging the touch input from the first display area to the second display area.

As described in FIG. 5, if an input signal identified by the display device corresponds to a first input signal, the display device may be able to display a following image of the first image in the first display area [S1320].

As described in FIG. 6 to FIG. 8, if an input signal identified by the display device corresponds to a second input signal, the display device moves the first image and may be then able to rotate the moved first image according to a vertical axis of the first image [S1330]. In case that the display device rotates the first image according to the vertical axis of a right-hand side of the first image, the display device may be able to provide a visual effect as if a part of the first image is floating in air due to a gradient of a curved area, i.e., a second display area.

In this case, as described in FIG. 9, the display device may be able to display a second image in the first display area according to the amount of rotation of the first image [S1340]. The second image may include additional information on the first image.

As described in FIG. 7, if an input signal identified by the display device corresponds to a third input signal, the display device may be able to display a third image, which is a backside of the first image, in the first display area [S1350]. The third image is the backside of the first image and may include additional information on the first image.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A display device according to one embodiment and a controlling method therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a display device can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, implementing in a form of a carrier wave such as a transmission via an internet and the like is also included. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A display device, comprising:
a sensor which senses a user input and delivers a signal according to a sensed result to a processor;
a display which displays an image, wherein the display includes a first display area which is planar and a second display area which is curved and concatenated with the first display area; and
the processor which controls the sensor and the display, wherein the processor controls to:
display a first image in the first display area and display a control interface related to the first image in the second display area,
display a following image of the first image in the first display area in response to detecting a first input signal,
move the first image and rotate the moved first image according to a vertical axis of the first image in response to detecting a second input signal, and
display a second image including an additional information related to the first image according to an amount of rotation of the first image,
wherein the second input signal includes a signal generated by a first touch input moving from the first display area to the second display area and a second touch input concatenated with the first touch input and continuously touching on the second display area for a preset time, and
wherein the processor adjusts the amount of rotation of the first image according to a position of the second touch input.

2. The display device of claim 1, wherein the first input signal includes a signal generated by a continuous touch input starting on the first display area and ending on the first display area.

3. The display device of claim 2, wherein the processor determines the following image of the first image according to a direction from a start point to an end point of the touch input corresponding to the first input signal.

4. The display device of claim 1, wherein the processor moves the first image according to a direction of the first touch input corresponding to the second input signal.

5. The display device of claim 1, wherein the processor displays the following image of the first image in the first display area in response to the first touch input corresponding to the second input signal and the processor displays the second image in the first display area in response to the second touch input corresponding to the second input signal.

6. The display device of claim 1, wherein the processor adjusts the amount of rotation of the first image according to a display curvature corresponding to the position of the second touch input.

7. The display device of claim 1, wherein the processor rotates the first image according to the vertical axis of a right-hand side of the first image in response to the second input signal.

8. The display device of claim 1, wherein when the first image is moved according to the second input signal, the processor uses the second display area as an additional display area of the first display area.

9. The display device of claim 8, wherein when the first image is moved according to the second input signal, the processor displays the first image over the first display area and the second display area.

10. The display device of claim 1, wherein the processor adjusts an amount of the additional information included in the second image according to the amount of rotation of the first image in accordance with the second input signal.

11. The display device of claim 1, wherein when the first image is rotated according to the second input signal, the processor provides a user interface to the first display area to generate the additional information related to the first image.

12. The display device of claim 1, wherein the processor displays a third image in the first display area in response to detecting a third input signal and wherein the third image is corresponding to a back side of the first image and includes the additional information related to the first image.

13. The display device of claim 12, wherein the third input signal includes a signal generated by a continuous touch input starting on the first display area and ending on the second display area.

14. The display device of claim 12, wherein when the third image is displayed according to the third input signal, the processor provides a user interface to the first display area to generate the additional information related to the first image.

15. The display device of claim 1, wherein the additional information includes at least one of a file information of the first image, an application information implementing the first image, a memo information for the first image, and a generation information of the first image.

16. The display device of claim 1, wherein the control interface includes at least one of an interface editing the first image, an interface configuring a path to store the first image, and an interface adjusting a magnification of the first image.

17. The display device of claim 1, wherein the processor bookmarks the first image in response to the second input signal.

18. A method of controlling a display device, which includes display including a first display area which is planar and a second display area which is curved and concatenated with the first display area, the method comprising:
displaying a first image in the first display area and a control interface related to the first image in the second display area;
displaying a following image of the first image in the first display area in response to detecting a first input signal;
moving the first image and rotating the moved first image according to a vertical axis of the first image in response to detecting a second input signal; and
displaying a second image including an additional information related to the first image according to an amount of rotation of the first image,
wherein the second input signal includes a signal generated by a first touch input moving from the first display area to the second display area and a second touch input concatenated with the first touch input and continuously touching on the second display area for a preset time, and
wherein the amount of rotation of the first image is adjusted according to a position of the second touch input.

* * * * *